US012604800B2

(12) United States Patent
Park et al.

(10) Patent No.: US 12,604,800 B2
(45) Date of Patent: Apr. 21, 2026

(54) MOWING APPARATUS INCLUDING DECK HEIGHT ADJUSTMENT PART

(71) Applicant: DAEDONG MOBILITY CORP., Anseong-si (KR)

(72) Inventors: Sang Ji Park, Jeonju-si (KR); Min Kyu Sun, Daegu (KR)

(73) Assignee: DAEDONG MOBILITY CORP., Anseong-si (KR)

( * ) Notice: Subject to any disclaimer, the term of this patent is extended or adjusted under 35 U.S.C. 154(b) by 380 days.

(21) Appl. No.: 18/372,676

(22) Filed: Sep. 25, 2023

(65) Prior Publication Data

US 2024/0324498 A1 Oct. 3, 2024

(30) Foreign Application Priority Data

Mar. 30, 2023 (KR) ........................ 10-2023-0041766

(51) Int. Cl.
*A01D 34/74* (2006.01)
*A01D 101/00* (2006.01)

(52) U.S. Cl.
CPC .......... *A01D 34/74* (2013.01); *A01D 2101/00* (2013.01)

(58) Field of Classification Search
CPC .. A01D 34/74; A01D 2101/00; A01D 34/661; A01D 34/64
See application file for complete search history.

(56) References Cited

U.S. PATENT DOCUMENTS

| | | | | |
|---|---|---|---|---|
| 8,919,087 | B2 * | 12/2014 | Lancaster | .............. A01D 34/74 56/15.8 |
| 12,010,944 | B2 * | 6/2024 | Garcia | ................... A01D 34/82 |
| 2005/0016143 | A1 * | 1/2005 | Thatcher | ............... A01D 34/74 56/15.6 |
| 2007/0012016 | A1 * | 1/2007 | Strope | .................... A01D 34/74 56/17.1 |
| 2021/0329835 | A1 * | 10/2021 | Steiner | ................. A01D 34/662 |

FOREIGN PATENT DOCUMENTS

CN 112470679 A * 3/2021 ............. A01D 34/64

OTHER PUBLICATIONS

Translation of Document CN-112470679-A as retrieved on Dec. 5, 2025 (Year: 2021).*

* cited by examiner

*Primary Examiner* — Joseph M Rocca
*Assistant Examiner* — Jose Antonio Martinez
(74) *Attorney, Agent, or Firm* — Revolution IP, PLLC

(57) ABSTRACT

A mowing apparatus includes: a deck unit mounted below a body frame and including a blade for mowing; a first deck link coupled to an upper surface of the deck unit; a rotary shaft rotatably provided below the body frame; a second deck link rotated together with the rotary shaft and disposed on the first deck link; a link arm coupling bolt coupled to an upper portion of the first deck link while passing through the second deck link; and a deck height adjustment part including a height adjustment bolt for adjusting a height of the link arm coupling bolt.

2 Claims, 3 Drawing Sheets

MOWING APPARATUS INCLUDING DECK HEIGHT ADJUSTMENT PART

BACKGROUND OF THE INVENTION

1. Field of the Invention

The present invention relates to a mowing apparatus including a deck height adjustment part capable of adjusting a fine height of a deck to which a blade is coupled.

2. Description of the Related Art

A mower is mainly known as a tool for cutting plants such as grains, grass, or miscellaneous trees, and is designed according to various shapes and uses. Previously, there was a mower that was used by being attached to an agricultural machine, but recently, it has developed into a riding-type mower having an independent engine. This riding-type mower is known as a "zero-turn mower", which has two front wheels 1, two rear wheels 2, and a body frame 10. A driver seat 11 is provided in the body frame 10 and levers 14 and 15 are located in front of the driver seat 11 to manipulate the movement of the zero-turn mower. Through these levers, it is possible to manipulate the forward movement, rearward movement, and direction change of the zero-turn mower, and a deck unit 3 may also adjust lift-up and lift-down of the zero-turn mower. The deck unit 3 is located between the front wheel 1 and the rear wheel 2 and includes a deck body 3a with a blade, and a front deck link 13 and a rear deck link 23 for moving the deck body. The deck body 3a is lifted up and down through the manipulation of the front deck link 13 and the rear deck link 23, cuts the grass or vegetation under the deck body 3a when the deck body 3a is lowered, and allows the zero-turn mower to smoothly move when the deck body 3a is lifted up.

SUMMARY OF THE INVENTION

The present invention proposes a vehicle having a deck height adjustment part capable of more precisely adjusting a front and rear height and a left and right height of a deck body in a state where the deck body is lifted up or down.

In addition, the present invention proposes an apparatus capable of adjusting grass workability if necessary by differently setting heights of front and rear sides of a deck by enabling fine adjustment of the deck body.

In addition, the present invention proposes an apparatus having a structure that does not interfere with an operation of a deck height adjustment part due to grass cut by a blade of a deck unit.

A mowing apparatus according to an embodiment includes: a deck unit mounted below a body frame and including a blade for mowing; a first deck link coupled to an upper surface of the deck unit; a rotary shaft rotatably provided below the body frame; a second deck link rotated together with the rotary shaft and disposed on the first deck link; a link arm coupling bolt coupled to an upper portion of the first deck link while passing through the second deck link; and a deck height adjustment part including a height adjustment bolt for adjusting a height of the link arm coupling bolt.

According to the configuration of the embodiment, it is possible to more precisely adjust the front and rear height and the left and right height of the deck unit in a state where the deck unit is lifted up or down.

In addition, it is possible to adjust grass workability if necessary by differently setting the heights of front and rear sides of the deck by enabling fine adjustment of the deck body.

In addition, because the mower apparatus has a structure that does not interfere with the operation of the deck height adjustment part due to the grass cut by the blade of the deck unit, it is possible to significantly reduce interference with operations of apparatus components due to the mowed grass.

DETAILED DESCRIPTION OF THE INVENTION

Hereinafter, embodiments of the present invention will be described with reference to the drawings.

Figure 2:
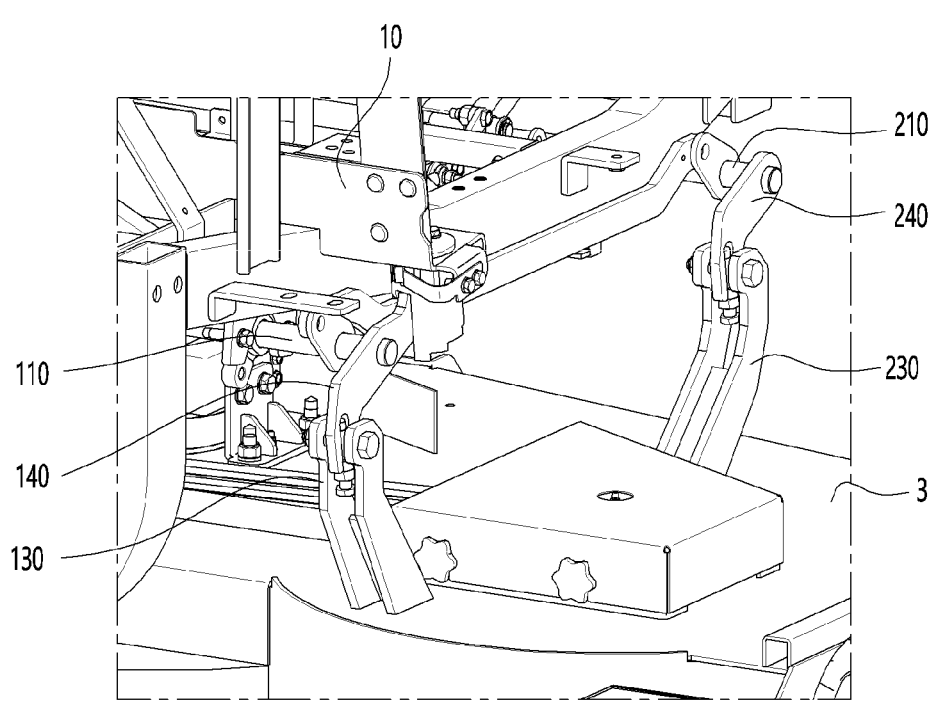
FIGS. 2 and 3 are enlarged views of the mowing apparatus including a deck height adjustment part according to the present embodiment and the deck height adjustment part, respectively.
Figure 3:
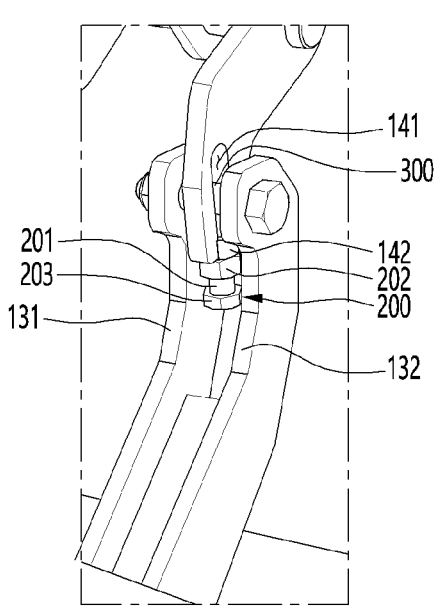

FIGS. 2 and 3 are enlarged views of a mowing apparatus including a deck height adjustment part according to the present embodiment and the deck height adjustment part, respectively.

Figure 1:
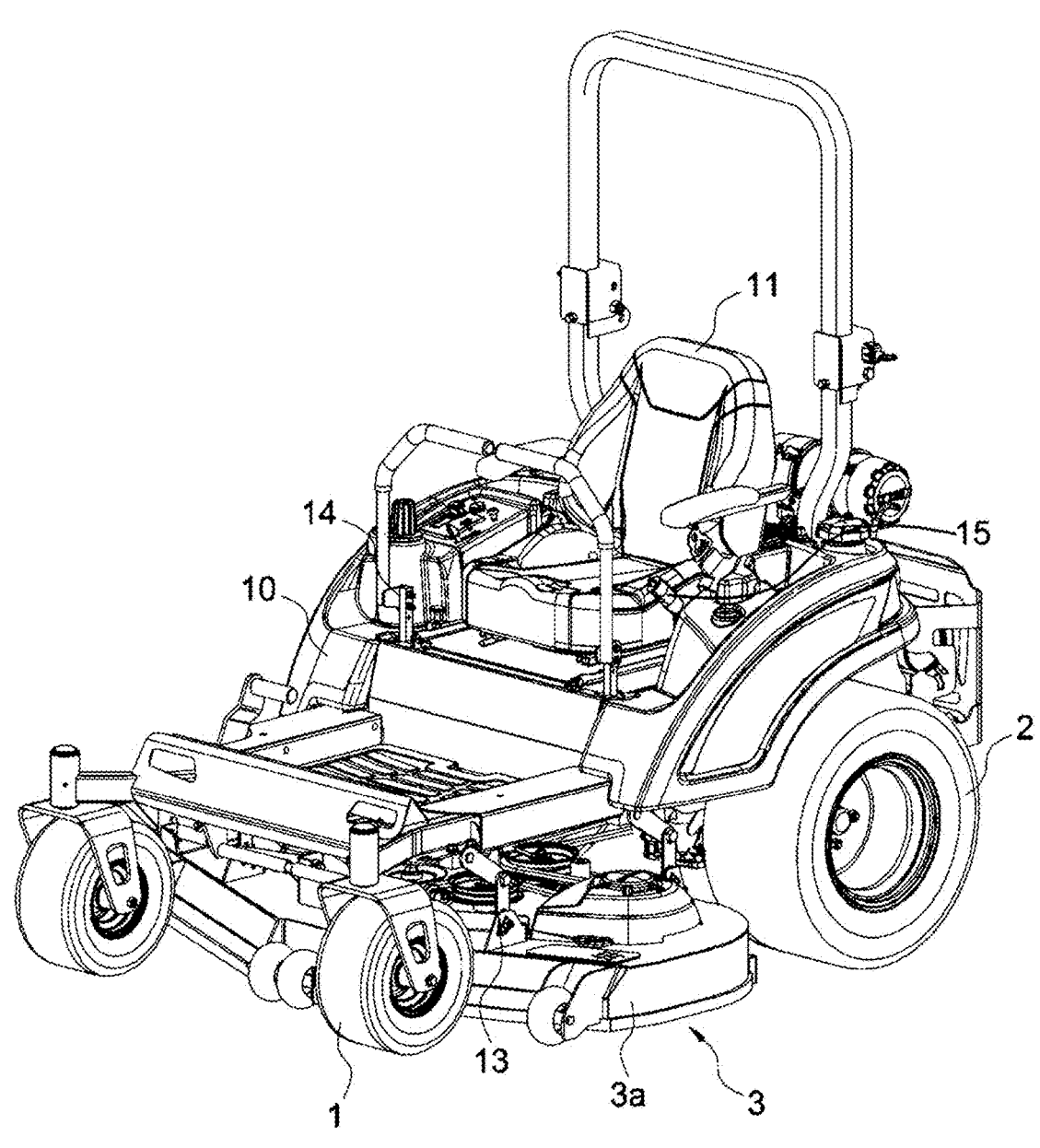
FIG. 1 is a view showing a zero-turn mower that is a mowing apparatus manufactured as an operation vehicle capable of riding a person.

According to the present embodiment, a riding-type mowing apparatus as illustrated in FIG. 1 is described by way of example, but a deck height adjustment part configured to adjust a height of a deck may be applied to more various types of mowers.

First, referring to FIG. 2, the mowing apparatus has a deck unit 3 mounted below a body frame 10, and the deck unit 3 is provided with at least one blade having a sharp surface for mowing grass.

The deck unit 3 is coupled to the body frame 10 through a plurality of deck links, and the deck links are coupled to front and rear sides of the deck unit 3, so that it is possible to lift up or down only the front side or the rear side of the deck unit 3 or it is possible to lift up both the front and rear sides of the deck unit 3.

According to the embodiment, the mowing apparatus includes a front deck link coupling the front side of the deck unit 3 to the body frame 10 and a rear deck link coupling the rear side of the deck unit 3 to the body frame 10.

The front deck link includes a first front deck link 130 coupled to an upper surface of the deck unit 3 and a second front deck link 140 coupled to the first front deck link 130 and the body frame 10, and the rear deck link also includes a first rear deck link 230 and a second rear deck link 240.

In addition, the front and rear rotary shafts 110 and 210 are coupled to the second front deck link 140 and the second rear deck link 240 to pass therethrough, respectively, and it is determined whether the front side or the rear side of the deck unit 3 is lifted up or down according to a direction in which the front rotary shaft 110 and the rear rotary shaft 210 rotate.

The front rotary shaft 110 and the rear rotary shaft 210 extend in left and right directions of a vehicle, respectively, so that two second front deck links and two second rear deck links are coupled to the front rotary shaft 110 and the rear rotary shaft 210, respectively.

Meanwhile, according to the embodiment, a deck height adjustment part 200 are provided between the first front deck link 130 and the second front deck link 140 to adjust a height of the first front deck link 130 while coupling the first front deck link 130 and the second front deck link 140, and the deck height adjustment part is also coupled between the first rear deck link 230 and the second rear deck link 240. Therefore, according to the embodiment, a total of four the deck height adjustment parts may be disposed at two front deck links and two rear deck links so as to finely adjust a height of the front side of the deck unit 3.

In this case, it is possible to finely adjust the heights of the front left side, the front right side, the rear left side, and the rear right side of the deck unit 3 separately if necessary.

Referring to FIG. 3, the configuration of the deck height adjustment part according to the embodiment will be described in more detail, the deck height adjustment part provided at the front deck link will be described, and the rear deck link is also provided with the deck height adjustment part with the same structure.

The first front deck link 130 includes a pair of link arms, and the link arms are disposed to be spaced apart from each other at a predetermined distance. That is, the first front deck link 130 includes a left link arm 131 and a right link arm 132, the left link arm 131 and the right link arm 132 are disposed to have a predetermined interval, and lower portions of the right link arm 132 and the left link arm 131 are coupled to the deck unit 3.

A lower portion of the second front deck link 140 is disposed in a space between the left link arm 131 and the right link arm 132, and these components are coupled by a link arm coupling bolt 300 passing through the left link arm 131, the right link arm 132, and the second front deck link 140. To this end, the left link arm 131 and the right link arm 132 are formed with a hole into which the link arm coupling bolt 300 may be inserted, and the second front deck link 140 is formed with a larger hole.

That is, in order to allow a lower portion of the second front deck link 140 to be located between the left link arm 131 and the right link arm 132a, an end portion of the second front deck link 140 has a shape that extends downward and is formed with a coupling bolt through-hole 141 such that the link arm coupling bolt 300 is inserted into the coupling bolt through-hole 141. In particular, the coupling bolt through-hole 141 is formed to have a shape in which the hole extends vertically such that the link arm coupling bolt 300 may move up or down.

When the front rotary shaft 110 (or the rear rotary shaft 210) rotates, the second front deck link 140 also rotates, and the height of the first front deck link 130 is raised or lowered according to a rotation direction of the second front deck link 140. That is, since the first front deck link 130 is connected to the second front deck link 140 by the link arm coupling bolt 300, in the case of FIG. 3, when the second front deck link 140 rotates counterclockwise, the first front deck link 130 is lifted up.

In particular, according to the present embodiment, after the rotary shafts 110 and 210 and of the second front deck link 140 rotate, followed by determination on the height/position of the first front deck link 130, it is possible for a user to directly adjust the height of the first front deck link 130.

To this end, a lower end portion 142 of the second front deck link 140 is formed with a hole having a size to allow a height adjustment bolt 201 to pass therethrough, and the height adjustment bolt 201 makes contact with the link arm coupling bolt 300 while passing through the lower end portion 142 of the second front deck link 140.

A height adjustment nut 202 is formed under the lower end portion 142 of the second front deck link 140, and the height adjustment bolt 201 makes contact with the link arm coupling bolt 300 after passing through the height adjustment nut 202 and the lower end portion 142 of the second front deck link.

The user may rotate a bolt head 203 formed at the end portion of the height adjustment bolt 201 so that an upper portion of the height adjustment bolt 201 pushes up the link arm coupling bolt 300 or a position of the link arm coupling bolt 300 is adjusted to be further lowered.

That is, according to the manipulation of the bolt head 203 by the user, an upper end portion of the height adjustment bolt 201 pushes up the link arm coupling bolt 300 so that the first front deck link 130 is lifted up or a height of the upper end portion of the height adjustment bolt 201 is lowered so that the link arm coupling bolt 300 is located at a lower position in the coupling bolt through-hole 141, thereby finely raising or lowering the height of the deck unit 3.

In particular, since the bolt head 203 of the height adjustment bolt 201 is configured to face a ground, the grass cut due to rotation of the blade inside the deck unit 3 may naturally fall down even when the grass splatters up to make contact with the bolt head 203. If the bolt head 203 of the height adjustment bolt 201 is disposed to face the sky opposite to the ground due to application of another structure, the possibility that the grass cut by the blade is accumulated on the bolt head, and the operation of the link arm coupling bolt or the height adjustment bolt is hindered due to the accumulated grass, as a result, leading to interference with rotation or lift-up of the front deck links.

According to the above description, in association with the front deck link, a front deck link, which is coupled to the deck unit is defined as a first deck link, and a member, which is disposed at a position higher than the first front deck link and is coupled to the front rotary shaft to rotate together, is defined as a second front deck link. However, when the definitions are made regardless of positions of the front and rear sides, a first deck link coupled to the deck unit and a second deck link coupled to an upper side of the first deck link may be defined, and the first deck link may be composed of a pair of link arms.

The following claims do not describe the first front deck link or the second front deck link, but describe the first deck link or the second deck link.

What is claimed is:

1. A mowing apparatus comprising:
   a deck unit mounted below a body frame and including a blade for mowing;
   a first deck link coupled to an upper surface of the deck unit;
   a rotary shaft rotatably provided below the body frame;
   a second deck link rotated together with the rotary shaft and disposed on the first deck link;
   a link arm coupling bolt coupled to an upper portion of the first deck link while passing through the second deck link; and
   a deck height adjustment part including a height adjustment bolt for adjusting a height of the link arm coupling bolt,
   wherein the first deck link includes a left link arm and a right link arm which are disposed to be spaced apart from each other at a predetermined interval, and
   a part of the second deck link is disposed between the left link arm and the right link arm, wherein the link arm coupling bolt is connected through the left link arm, the second deck link, and the right link arm, and the height adjustment bolt makes contact with the link arm coupling bolt while passing through a lower surface of the second deck link, and wherein a coupling bolt through-hole is formed in the second deck link such that the link arm coupling bolt is inserted into the coupling bolt through-hole, and the coupling bolt through-hole is configured as a hole having a shape that extends vertically such that the link arm coupling bolt is movable up and down.

2. The mowing apparatus of claim 1, wherein a bolt head is formed at an end portion of the height adjustment bolt, the bolt head is configured to face a ground, and the mowing apparatus includes a deck height adjustment part to adjust a height of the deck unit by lifting up the link arm coupling bolt or lowering a height of the link arm coupling bolt according to rotation of the height adjustment bolt.

\*  \*  \*  \*  \*